United States Patent
Jing (10) Patent No.: US 10,404,665 B2
(45) Date of Patent: Sep. 3, 2019

(54) TERMINAL MANAGEMENT METHOD AND SYSTEM, SERVER AND TERMINAL

(71) Applicant: ZTE CORPORATION, Shenzhen (CN)

(72) Inventor: Shibin Jing, Shenzhen (CN)

(73) Assignee: ZTE CORPORATION (CN)

( * ) Notice: Subject to any disclaimer, the term of this patent is extended or adjusted under 35 U.S.C. 154(b) by 254 days.

(21) Appl. No.: 15/319,972

(22) PCT Filed: Aug. 22, 2014

(86) PCT No.: PCT/CN2014/085070
§ 371 (c)(1),
(2) Date: Apr. 4, 2017

(87) PCT Pub. No.: WO2015/192468
PCT Pub. Date: Dec. 23, 2015

(65) Prior Publication Data
US 2017/0208042 A1 Jul. 20, 2017

(30) Foreign Application Priority Data
Jun. 19, 2014 (CN) .......................... 2014 1 0276536

(51) Int. Cl.
*H04L 29/06* (2006.01)
*G06F 21/60* (2013.01)
(Continued)

(52) U.S. Cl.
CPC ........ *H04L 63/0428* (2013.01); *G06F 21/602* (2013.01); *G06F 21/606* (2013.01);
(Continued)

(58) Field of Classification Search
CPC .................................................. H04L 63/0428
See application file for complete search history.

(56) References Cited

U.S. PATENT DOCUMENTS

| 5,875,296 A | * | 2/1999 | Shi | .......................... G06F 21/41 726/5 |
| 2002/0016830 A1 | * | 2/2002 | Nicolai | ............. G06F 17/30867 709/219 |

(Continued)

FOREIGN PATENT DOCUMENTS

| CN | 1671106 | 9/2005 |
| CN | 101882075 A | 11/2010 |

(Continued)

OTHER PUBLICATIONS

Dufourd, J-C., Olivier Avaro, and Cyril Concolato. "An MPEG standard for rich media services." IEEE multimedia 12.4 (2005): 60-68. (Year: 2005).*

(Continued)

*Primary Examiner* — Shawnchoy Rahman
(74) *Attorney, Agent, or Firm* — McDonald Hopkins LLC (57) ABSTRACT

A terminal management method and system, a server and a terminal are described. The terminal management method includes: a server configuring rich text information used for prompting a user for a terminal, the server selecting corresponding rich text information according to identification information of the terminal which is managed at current, adding the corresponding rich text information into a newly added extended field of a notification command of an OMA-DM protocol, and sending the notification command to the terminal such that the terminal prompts the user according to the rich text information.

12 Claims, 5 Drawing Sheets

(51) Int. Cl.
*H04L 29/08* (2006.01)
*H04W 12/02* (2009.01)
*H04L 12/24* (2006.01)

(52) U.S. Cl.
CPC ............ *H04L 67/26* (2013.01); *H04W 12/02* (2013.01); *H04L 41/0213* (2013.01); *H04L 67/02* (2013.01)

(56) References Cited

U.S. PATENT DOCUMENTS

| | | | | |
|---|---|---|---|---|
| 2004/0090466 | A1* | 5/2004 | Loveria, III | ............ G09G 5/14 715/781 |
| 2005/0210123 | A1 | 9/2005 | Wang et al. | |
| 2007/0100968 | A1* | 5/2007 | Ordogh | ................ H04W 28/06 709/220 |
| 2010/0048193 | A1 | 2/2010 | Ortion et al. | |
| 2012/0106431 | A1* | 5/2012 | Wu | ......................... H04W 4/00 370/312 |

FOREIGN PATENT DOCUMENTS

| | | |
|---|---|---|
| CN | 102006303 A | 4/2011 |
| CN | 102662984 A | 9/2012 |
| CN | 103684822 | 3/2014 |
| CN | 103716191 | 4/2014 |
| CN | 103809952 A | 5/2014 |
| JP | 2002334113 A | 11/2002 |
| JP | 2004030354 A | 1/2004 |
| JP | 2004287645 A | 10/2004 |
| JP | 2006018508 A | 1/2006 |
| JP | 2008514079 A | 5/2008 |
| JP | 2008219266 A | 9/2008 |
| JP | 2011515893 A | 5/2011 |
| JP | 2013519332 A | 5/2013 |
| JP | 2013527651 A | 6/2013 |
| JP | 2013200651 A | 10/2013 |

OTHER PUBLICATIONS

Office Action dated Jan. 23, 2018 for Japanese Patent Application No. 2016-574178.
International Search Report for PCT/CN2014/085070, English Translation attached to original, Both completed by the Chinese Patent Office dated Feb. 12, 2015, All together 5 Pages.
Japanese Office Action dated Sep. 18, 2018 for Japanese Patent Application No. 2016-574178.
Office Action issued Apr. 8, 2019 for Chinese Patent Application No. 201410276536.6 and the English translation thereof.

* cited by examiner

TERMINAL MANAGEMENT METHOD AND SYSTEM, SERVER AND TERMINAL

CROSS-REFERENCE TO RELATED APPLICATION

This application is the U.S. national phase of PCT Application No. PCT/CN2014/085070 filed Aug. 22, 2014, which claims priority to Chinese Application No. 201410276536.6 filed Jun. 19, 2014, the disclosures of which are incorporated in their entirety by reference herein.

TECHNICAL FIELD

The present document relates to the technical field of terminal management, in particular to a terminal management method and system, a server and a terminal.

BACKGROUND

In terminal management tasks, management tasks are initiated by a device, a user or a server, the device is connected to the server to initiate a session, and after the server authenticates a client, the server sends a series of management commands, such as Get (collect device parameters), Replace (configure device parameters) and Exec (execute update) and other commands. In this process, the server may send some notifications (Alerts) to prompt the user. In the related art, prompting modes in an OMA-DM (Open Mobile Alliance Device Management) protocol are notification modes based on plain texts and can only satisfy relatively simple user prompt demands, such as prompting the user that there is no available update at current, a latest state can be reached through updating only after upgrade is performed for two times and whether upgrade is wanted because a mobile phone needs to be restarted for a purpose of upgrade.

However, at present, the server based on an alert notification mode can only push some simple plain text information to users to prompt the users. But the server cannot push formatted character information, picture information or video information to the users to prompt the users, and this cannot satisfy diversified and humanized user prompt demands. For example, when an SD upgrade packet or an ROM packet is sent, introduction information with pictures and characters and formatted user comment information cannot be sent to the users to enable the users to be capable of better experiencing upgrade functions. Or when an operator has new services, featured functions cannot be pushed to the users by means of character, picture or video information. Or when the users meet a problem which causes an upgrade to fail in an upgrade process, the operator cannot send formatted characters to the users to collect feedback information, etc.

SUMMARY

The embodiments of the present document provide a terminal management method and system, a server and a terminal, which solve the problem that a sever cannot send formatted character information, picture information or video information to a user to prompt the user in a terminal management process.

The embodiment of the present document provides a terminal management method, including:

a server configuring rich text information used for prompting a user for a terminal; and the server selecting corresponding rich text information according to identification information of the terminal which is managed at current, adding the corresponding rich text information into a newly added extended field of a notification command of an OMA-DM protocol, and sending the notification command to the terminal such that the terminal prompts the user according to the rich text information.

Alternatively, the method further includes:

before adding the rich text information into the extended field, performing encoding to the rich text information; and adding information about an encoding format for encoding the rich text information into the extended field such that the terminal performs decoding to the rich text information;

or before adding the rich text information into the extended field, performing encryption to the rich text information; and adding information about an encryption algorithm for encrypting the rich text information into the extended field such that the terminal performs decryption to the rich text information;

or before adding the rich text information into the extended field, performing encryption and encoding to the rich text information; and adding information about an encoding format for encoding the rich text information and information about an encryption algorithm for encrypting the rich text information into the extended field such that the terminal performs decoding and decryption to the rich text information.

Alternatively, the rich text information includes HTML format data or a website address.

Also in order to solve the above-mentioned technical problem, the present document further provides another terminal management method, including: a terminal extracting rich text information from a newly added extended field of a notification command of an OMA-DM protocol, and prompting a user according to the rich text information.

Alternatively, before prompting the user according to the rich text information, the method further includes: extracting information about an encoding format from the extended field of the notification command and then performing decoding to the rich text information according to the information about the encoding format;

or extracting information about an encryption algorithm from the extended field of the notification command and then performing decryption to the rich text information according to the information about the encryption algorithm;

or extracting information about an encoding format and information about an encryption algorithm from the extended field of the notification command and then performing decoding and decryption to the rich text information according to the information about the encoding format and the information about the encryption algorithm.

Alternatively, the rich text information includes HTML format data, and the step of prompting the user according to the rich text information includes: the terminal calling a local browser control to display the HTML format data; or the rich text information includes a website address, and the step of prompting the user according to the rich text information includes: the terminal calling a local browser control to open the website address and display webpage contents corresponding to the website address.

Also in order to solve the above-mentioned technical problem, the embodiment of the present document further provides another terminal management method, including the following steps:

a server configuring rich text information used for prompting a user for a terminal;

the server selecting corresponding rich text information according to identification information of the terminal which is managed at current, adding the corresponding rich text information into a newly added extended field of a notification command of an OMA-DM protocol, and sending the notification command to the terminal; and the terminal extracting the rich text information from the newly added extended field of the notification command of the OMA-DM protocol and prompting the user according to the rich text information.

Also in order to solve the above-mentioned technical problem, the embodiment of the present document further provides a server, including: a configuration module, a processing module and a sending module, herein, the configuration module is arranged to configure rich text information used for prompting a user for a terminal;

the processing module is arranged to select corresponding rich text information according to identification information of the terminal which is managed at current, and add the corresponding rich text information into a newly added extended field of a notification command of an OMA-DM protocol; and the sending module is arranged to send the notification command to the terminal such that the terminal prompts the user according to the rich text information.

Alternatively, the server further includes an encoding module; the encoding module is arranged to, before the processing module adds the rich text information into the extended field, perform encoding to the rich text information; and the processing module is further arranged to add information about an encryption algorithm adopted by the encoding module for encrypting the rich text information into the extended field such that the terminal performs decryption to the rich text information;

or the server further includes an encryption module; the encryption module is arranged to, before the processing module adds the rich text information into the extended field, perform encryption to the rich text information; and the processing module is further arranged to add information about an encryption algorithm adopted by the encryption module for encrypting the rich text information into the extended field such that the terminal performs decryption to the rich text information;

or the server further includes an encryption module and an encoding module; the encryption module is arranged to, before the processing module adds the rich text information into the extended field, perform encryption to the rich text information;

the encoding module is arranged to perform encoding to the rich text information encrypted by the encryption module; and the processing module is further arranged to add information about an encoding format for encoding the rich text information and information about an encryption algorithm for encrypting the rich text information into the extended field such that the terminal performs decoding and decryption to the rich text information.

Alternatively, the rich text information includes HTML format data or a website address.

Also in order to solve the above-mentioned technical problem, the embodiment of the present document further provides a terminal, including: an extraction module and a prompt module, herein, the extraction module is arranged to extract rich text information from a newly added extended field of a notification command of an OMA-DM protocol; and the prompt module is arranged to prompt a user according to the rich text information.

Alternatively, the terminal further includes a decoding module; the extraction module is further arranged to extract information about an encoding format from the extended field of the notification command; and the decoding module is arranged to, before the prompt module prompts the user according to the rich text information, perform decoding to the rich text information according to the information about the encoding format;

or the terminal further includes a decryption module; the extraction module is further arranged to extract information about an encryption algorithm from the extended field of the notification command; and the decryption module is arranged to, before the prompt module prompts the user according to the rich text information, perform decryption to the rich text information according to the information about the encryption algorithm;

or the terminal further includes a decoding module and a decryption module; the extraction module is further arranged to extract information about an encoding format and information about an encryption algorithm from the extended field of the notification command; the decoding module is arranged to, before the prompt module prompts the user according to the rich text information, perform decoding to the rich text information according to the information about the encoding format; and the decryption module is arranged to, before the prompt module prompts the user according to the rich text information, perform decryption to the rich text information decrypted by the decoding module according to the information about the encryption algorithm.

Alternatively, the prompt module is arranged to, when the rich text information includes HTML format data, call a local browser control of the terminal to display the HTML format data; and when the rich text information includes a website address, call a local browser control of the terminal to open the website address and display webpage contents corresponding to the website address.

Also in order to solve the above-mentioned technical problem, the embodiment of the present document further provides a terminal management system, including a server and a terminal;

the server includes a configuration module, a processing module and a sending module;

the terminal includes an extraction module and a prompt module;

the configuration module is arranged to configure rich text information used for prompting a user for the terminal;

the processing module is arranged to select corresponding rich text information according to identification information of the terminal which is managed at current, and add the corresponding rich text information into a newly added extended field of a notification command of an OMA-DM protocol;

the sending module is arranged to send the notification command to the terminal;

the extraction module is arranged to extract the rich text information from the newly added extended field of the notification command of the OMA-DM protocol; and the prompt module is arranged to prompt the user according to the rich text information.

The embodiment of the present document further provides a computer program, including program instructions, which, when executed by a server, cause the server to be capable of executing the method.

The embodiment of the present document further provides a computer program, including program instructions, which, when executed by a terminal, cause the terminal to be capable of executing the method.

The embodiment of the present document further provides a carrier carrying any one of the computer programs.

According to the terminal management method and system, the server and the terminal provided by the embodiments of the present document, formatted character information, picture information or video information can be sent to the user terminal to prompt the user, and the user experience is improved. The server in the method provided by the embodiment of the present document sends rich text information to the terminal through the notification command of the OMA-DM protocol to prompt the user. Due to the feature of the rich text format, the rich text information can include the formatted character information, picture information or video information. Therefore, by adopting the information sending method provided by the embodiment of the present document, the server can push information such as formatted characters, pictures and videos, instead of some simple character information prompt only, to the user to prompt the user. As compared with the prior art, the server can be enabled to flexibly send notification messages, the user experience in the terminal management process can be greatly improved and the user can be better helped to use the terminal manage tasks.

PREFERRED EMBODIMENTS OF THE DOCUMENT

The embodiments of the present document will be described below in detail with reference to the drawings. The embodiments of the present document and the features in the embodiments may be mutually and freely combined under the situation of no conflict.

Embodiment One

Figure 1:
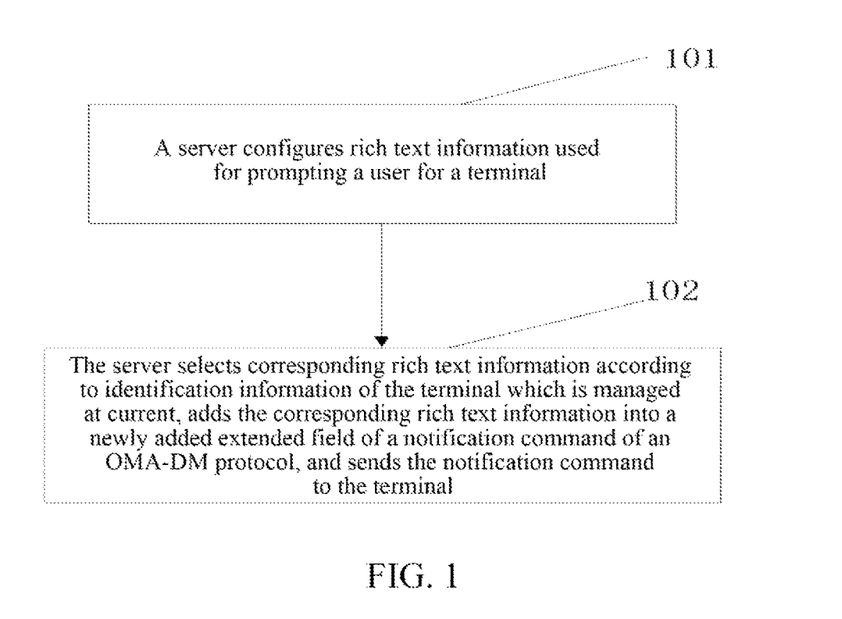
FIG. 1 illustrates a flowchart of a terminal management method provided by embodiment one of the present document.

In consideration of the problem that a server adopting the existing notification prompting method can only send simple character information to a terminal device to prompt a user and cannot send picture information, video information or formatted character information to the terminal to prompt the user, this embodiment provides a terminal management method, which is executed by a server, as illustrated in FIG. 1. The method includes the following steps.

In step 101, a server configures rich text information used for prompting a user for a terminal.

In the method provided by this embodiment, the server may configure different rich text information aiming at different terminals and send rich text information corresponding to the managed terminal to the managed terminal in a management process.

In this embodiment, the rich text information includes rich text format data and may at least include at least one of picture information, video information and formatted character information. The rich text information in this embodiment may further include other forms of information.

In the method provided by this embodiment, rich text information which satisfies user demands may be configured on the server according to actual demands, e.g., picture information or video information for receiving a new service is configured.

In step 102, the server selects corresponding rich text information according to identification information of the terminal which is managed at current to add into a newly added extended field of a notification command of an OMA-DM protocol, and sends the notification command to the terminal.

The method provided by this embodiment may be applied to a process that the server manages the terminal. At this moment, the server sends the rich text information used for prompting the user to the terminal, and the terminal prompts the user according to the rich text information. In the method provided by this embodiment, the current management task may be initiated by the terminal and may also be initiated by the server.

Since different rich text information is configured in the server aiming at different terminals, the rich text information corresponding to the terminal which is managed at current needs to be selected and sent to the terminal in the terminal management process. In the method provided by this embodiment, the rich text information corresponding to the terminal is selected according to identification information of the terminal.

In this embodiment, the identification information of the terminal may include: model number of terminal device and version number of terminal device, or other identification information which can distinguish terminals.

In the terminal management method provided by this embodiment, by modifying a command in the original protocol, adding the rich text information into the command to send to the terminal, resources can be saved. Alternatively, an Alert command in the OMA-DM protocol may be extended and a Data field is added into the Alert command to carry the rich text information; and through the Alert command, character information in the original Alert command and newly added rich text information are sent to the terminal such that the terminal prompts the user.

In the terminal management method provided by this embodiment, the rich text information is sent to the terminal to prompt the user through the Alert command. Due to the features of the rich text format, the rich text information may include formatted character information, picture information or video information. Therefore, by adopting the information sending method provided by this embodiment, the server can push information such as formatted characters, pictures and videos, instead of some simple character information only, to the user to prompt the user. As compared with the prior art, the server can be enabled to flexibly send notification messages, the user experience in the terminal management process can be greatly improved and the user can be better helped to use the terminal manage tasks.

In order to facilitate data transmission or satisfy OMA-DM protocol requirements, the terminal management method provided by this embodiment, before the rich text information is added into the extended field, may further include the following operation: encoding is performed to the rich text information. In order to enable the terminal side to be capable of performing decoding, in the method provided by this embodiment, information about an encoding format for encoding the rich text information may also be added into the extended field such that the terminal performs decoding to the rich text information.

In consideration of security of data transmission, the terminal management method provided by this embodiment, after encoding is performed to the rich text information and before the rich text information is added into the extended field, may further include the following operation: encryption is performed to the rich text information. In order to enable the terminal side to be capable of performing decryption to obtain the rich text information, the method provided by this embodiment may further include the following operation: information about an encryption algorithm for encrypting the rich text information is added into the extended field such that the terminal performs decryption to the decoded rich text information.

In the terminal management method provided by this embodiment, encryption and encoding may be performed to the rich text information before the rich text information is added into the extended field; and then information about an encoding format for encoding the rich text information and information about an encryption algorithm for encrypting the rich text information are added into the extended field such that the terminal performs decoding and decryption to the rich text information.

Preferentially, in this embodiment, a type of the rich text information may also be added into the extended field and is used for prompting the terminal.

In this embodiment, the rich text information may include HTML (Hypertext Markup Language) format data or a website address; when the rich text information includes the HTML format data, the terminal, after receiving the HTML format data, will call a local browser control to realize the HTML format data; when the rich text information includes the website address, the terminal, after receiving the website address, will call the local browser control to open the website address and present webpage contents corresponding to the website address to the user, such that the user can directly see prompt information such as texts, pictures and videos at the website address and the user can also perform some interaction in the website, e.g., operations such as viewing some comment information, submitting some upgrade problems; and the user experience is greatly improved.

A detailed process of extending an Alert command in this embodiment will be introduced below:

1. The Alert command in the OMA-DM protocol is extended and a Data field is added into the Alert command and is used for carrying the rich text information.

2. Contents of the Data field in the Alert command are added and may include DATATYPE (data type), ENCODE (data encoding format), ENCRYPT (data encryption algorithm) and DATA (i.e., rich text data).

Only after encoding and encryption are performed to the rich text information, ENCODE and ENCRYPT can be added. If encoding and encryption are not performed to the rich text information, ENCODE and ENCRYPT do not need to be added.

3. When the server sends the HTML format rich text data to the terminal according to the need, DATATYPE=RICHTEXT is defined; and after the terminal receives the data, DATATYPE is judged as RICHTEXT, thereafter corresponding decoding and decryption are performed to DATA according to ENCODE (data encoding format) and ENCRYPT (data encryption algorithm) to acquire the HTML format data, then the local browser control is directly called to display and additional development is not needed. The following contents are Data field defined contents when the HTML format data are sent:

```
<Alert>
  <CmdID>2</CmdID>
  <Data>1105</Data>
  <Item><Data>DATATYPE=RICHTEXT</Data></Item>
  <Item><Data>ENCODE=BASE64</Data></Item>
  <Item><Data>ENCRYPT=DES</Data></Item>
  <Item>
<Data>PGgxPk1hbmFnZW1lbnQgaW4gcHJvZ3J1c3M8L
  2gxPgo8YnIgLz4KPHN0cm9uZz5w
  bGVhc2Ugc2V1IHRoZSBwaWN0dXJ1PC9zdHJvbmc+
  CjxiciAvPgo8aW1nIHNyYz0iaHR0cD
  ovL3d3dy56dGUuY29tLmNuL2NuL21tYWdlcy9tYXA
  wMS5naWYiIC8+</Data>
  </Item>
</Alert>
```

DATATYPE=RICHTEXT represents that a client needs to display rich text information.

ENCODE=BASE64 represents that data are encoded by adopting base 64.

ENCRYPT=DES represents that data further need to be decrypted after being decoded. This value may be omitted. If an ENCRYPT parameter is not sent, data do not need to be decrypted.

DATA represents data, html data are obtained after decoding and decryption and the client directly uses the browser control to display \<h1\>Management in progress\</h1\>
\<br/\>
\<strong\>please see the picture\</strong\>
\<br/\>
\<imgsrc="http://www.zte.com.cn/cn/images/
map01.gif"/\>

4. When the server sends a website address to the terminal according to the need, DATATYPE=URL is defined; and after the terminal receives the data and DATATYPE is judged as URL, corresponding decoding and decryption are performed according to an encoding type of ENCODE and a data encryption type of ENCRYPT to obtain the website address, and the terminal can directly call the local browser control to open the website address. The following contents are Data field defined contents when the website address is sent:

\<Alert\>
  \<CmdID\>2\</CmdID\>
  \<Data\>1105\</Data\>
  \<Item\>\<Data\>DATATYPE=URL\</Data\>\</Item\>
  \<Item\>\<Data\>ENCODE=BASE64\</Data\>\</Item\>
  \<Item\>\<Data\>ENCRYPT=DES\</Data\>\</Item\>
  \<Item\>
  \<Data\>aHR0cDovL3d3dy56dGUuY29tLmNu\</Data\>
  \</Item\>
\</Alert\>

DATATYPE=URL represents that a client needs to display a website address.

ENCODE=BASE64 represents that data are encoded by adopting base 64.

ENCRYPT=DES represents that data further need to be decrypted after being decoded. This value may be omitted. If an ENCRYPT parameter is not sent, data do not need to be decrypted.

DATA represents data, the website address is obtained after decoding and decryption, and the client directly use the browser plug-into open a webpage.

By adopting the terminal management method provided by this embodiment, picture information, video information or formatted character information can be pushed to the terminal and the user experience is greatly improved.

Embodiment Two

This embodiment provides a terminal management method, which is executed by a terminal and includes the following step:

A terminal extracts rich text information from a newly added extended field of a notification command of an OMA-DM protocol, and prompts a user according to the rich text information.

In the method provided by this embodiment, the terminal may acquire the rich text information sent by a management end, i.e., a server, for example, the rich text information may include picture information or video information, and then the picture information or the video information is presented to the user to achieve an effect of prompting the user.

By adopting the prompting method provided by this embodiment, picture information, video information or formatted character information may be presented to the user and the user experience is greatly improved.

If the server has performed encoding to the rich text information, the terminal further needs to perform decoding to the extracted rich text information. Specifically, the terminal management method provided by this embodiment, before the user is prompted according to the rich text information, further includes the following operations: information about an encoding format is extracted from the extended field of the notification command and then decoding is performed to the rich text information according to the information about the encoding format.

If the server has performed encryption to the rich text information, the terminal further needs to perform decryption to the extracted rich text information. Based on the above-mentioned method, the terminal management method provided by this embodiment, before the user is prompted according to the rich text information, further includes the following operations: information about an encryption algorithm is extracted from the extended field of the notification command and then decryption is performed to the rich text information according to the information about the encryption algorithm.

If the server has performed encryption and encoding to the rich text information, the terminal further needs to perform decoding and decryption to the extracted rich text information. Based on the above-mentioned method, the terminal management provided by this embodiment, before the user is prompted according to the rich text information, further includes the following operations: information about an encoding format and information about an encryption algorithm are extracted from the extended field of the notification command and then decoding and decryption are performed to the rich text information according to the information about the encoding format and the information about the encryption algorithm.

In the terminal management method provided by this embodiment, if the received rich text information is HTML format data, the step of prompting the user according to the rich text information in the prompting method provided by this embodiment includes: the terminal calls a local browser control to display the HTML format data.

If the received rich text information is a website address, the step of prompting the user according to the rich text information in the prompting method provided by this embodiment includes: the terminal calls a local browser control to open the website address and display webpage contents corresponding to the website address.

Embodiment Three

Figure 2:
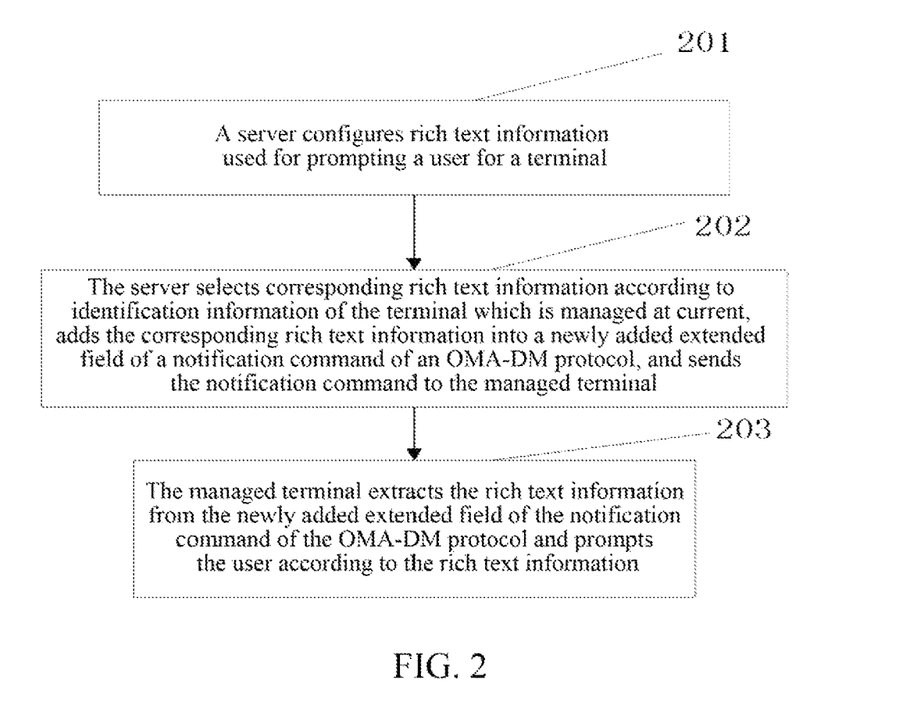
FIG. 2 illustrates a flowchart of a terminal management method provided by embodiment three of the present document.

As illustrated in FIG. 2, this embodiment provides a terminal management method, which is executed by a server and a terminal. The method includes the following steps:

In step 201, a server configures rich text information used for prompting a user for a terminal.

In step 202, the server selects corresponding rich text information according to identification information of the terminal which is managed at current to add into a newly added extended field of a notification command of an OMA-DM protocol, and sends the notification command to the managed terminal.

In step 203, the managed terminal extracts the rich text information from the newly added extended field of the notification command of the OMA-DM protocol and prompts the user according to the rich text information.

In the terminal management method provided by this embodiment, the rich text information is sent to the terminal to prompt the user through the notification command of the OMA-DM protocol. Due to the features of the rich text format, the rich text information may include formatted character information, picture information or video information. Therefore, by adopting the prompting method provided by the present document, the server can push information such as formatted characters, pictures and videos, instead of some simple character information only, to the user to prompt the user. As compared with the prior art, the server can be enabled to flexibly send notification messages, the user experience in the terminal management process can be greatly improved and the user can be better helped to use the terminal manage tasks. In addition, since only the original notification command of the OMA-DM protocol needs to be modified in the method provided by this embodiment, the implementation is simple and the cost is lower.

Figure 3:
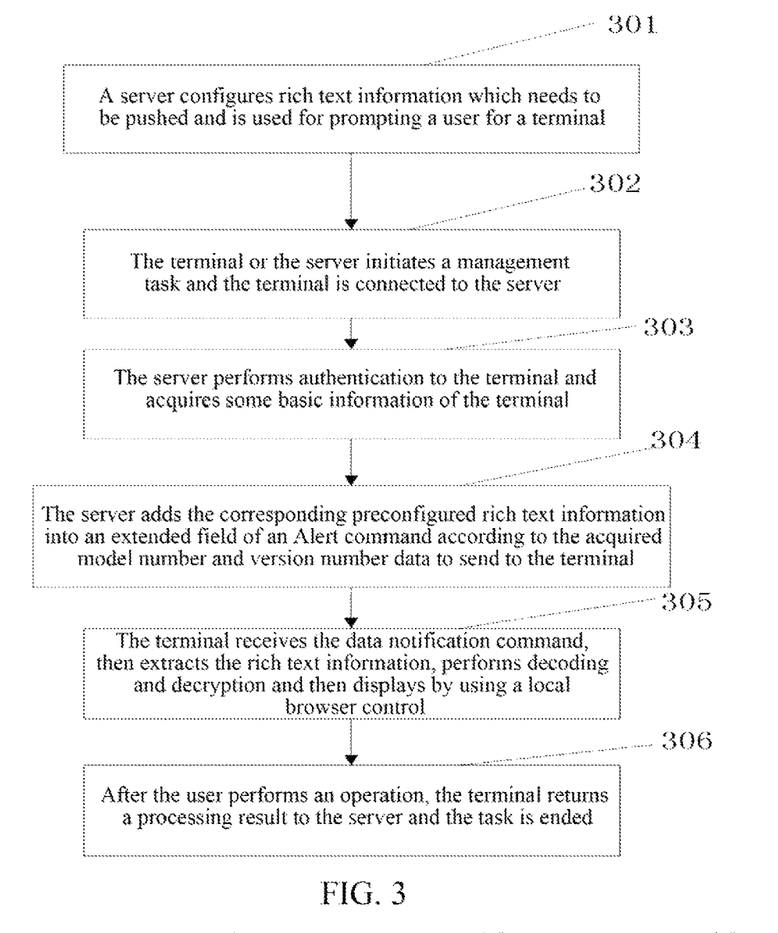
FIG. 3 illustrates a flowchart of another terminal management method provided by embodiment three of the present document.

The terminal management method provided by this embodiment will be specifically introduced below, as illustrated in FIG. 3.

In step 301, a server configures rich text information which needs to be pushed and is used for prompting a user for a terminal.

In step 302, the terminal or the server initiates a management task and the terminal is connected to the server.

In step 303, the server performs authentication to the terminal and acquires a model number and a version number of the terminal.

In step 304, the server adds the corresponding preconfigured rich text information into an extended field of an Alert command according to the acquired model number and version number data to send to the terminal.

Specifically, the rich text information may be added into the Alert command after encoding and/or encryption are performed to the rich text information, then information about an encoding format for encoding and/or information about an encryption algorithm for encryption are simultaneously added into the Alert command to send to the terminal.

In step 305, after receiving the Alert command, the terminal extracts the rich text information, performs decoding and decryption and then displays the rich text information by using a local browser control.

Herein, after the terminal receives the Alert command, the terminal extracts the rich text information from the Alert command, then extracts the information about the encoding format and the information about the encryption algorithm, performs encoding and decryption and finally calls the local browser control to display. If the rich text information is HTML format data, the local browser control is directly called to display the HTML format data; and when the rich text information is a website address, the local browser control is called to open the website address and present webpage contents corresponding to the website address to the user.

In step 306, after the user performs an operation, the terminal returns a processing result to the server and the task is ended.

Embodiment Four

Figure 4:
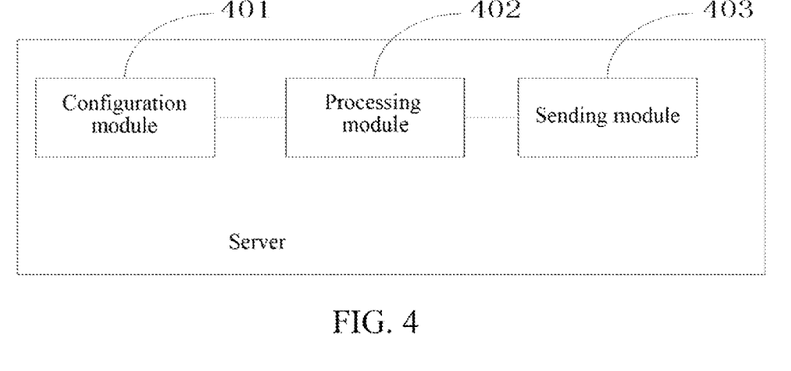
FIG. 4 illustrates a structural schematic diagram of the first server provided by embodiment four of the present document.

As illustrated in FIG. 4, this embodiment provides a server, including a configuration module 401, a processing module 402 and a sending module 403, herein, the configuration module 401 is arranged to configure rich text information used for prompting a user for a terminal;

the processing module 402 is arranged to select corresponding rich text information according to identification information of the terminal which is managed at current, and add the corresponding rich text information into a newly added extended field of a notification command of an OMA-DM protocol; and the sending module 403 is arranged to send the notification command to the terminal such that the terminal prompts the user according to the rich text information.

The server provided by this embodiment can send formatted character information, picture information or video information to the terminal to prompt the user through the notification command of the OMA-DM protocol, and thereby the user experience is greatly improved.

Figure 5:
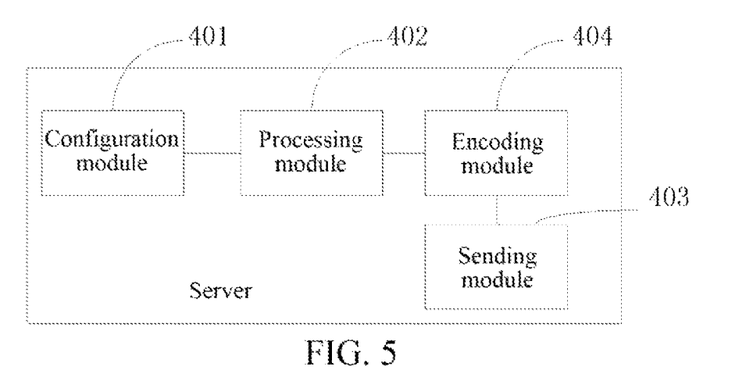
FIG. 5 illustrates a structural schematic diagram of the second server provided by embodiment four of the present document.

In consideration of data transmission or protocol requirements, based on the above-mentioned server, as illustrated in FIG. 5, in an improvement solution, the server provided by this embodiment may further include an encoding module 404; the encoding module 404 is arranged to, before the processing module 402 adds the rich text information into the extended field, perform encoding to the rich text information; and at this moment, the processing module 402 is further arranged to add information about an encryption algorithm adopted by the encoding module 404 for encrypting the rich text information into the extended field such that the terminal performs decryption to the rich text information.

Figure 6:
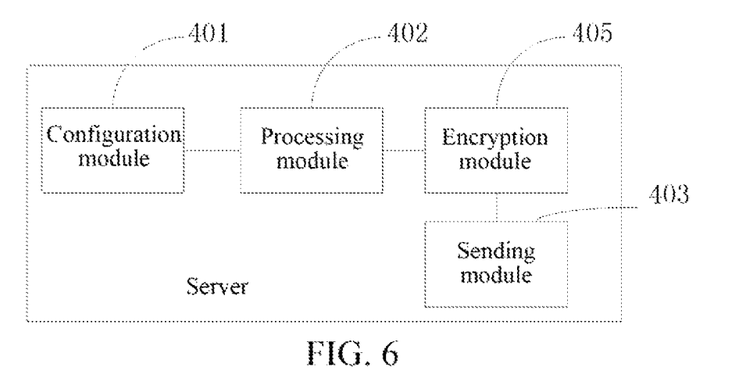
FIG. 6 illustrates a structural schematic diagram of the third server provided by embodiment four of the present document.

In consideration of security of data transmission, based on the above-mentioned server, as illustrated in FIG. 6, in another improvement solution, the server provided by this embodiment may further include an encryption module 405; the encryption module 405 is arranged to, before the processing module 42 adds the rich text information into the extended field, perform encryption to the rich text information; and at this moment, the processing module 402 is further arranged to add information about an encryption algorithm adopted by the encryption module 405 for encrypting the rich text information into the extended field such that the terminal performs decryption to the rich text information.

Figure 7:
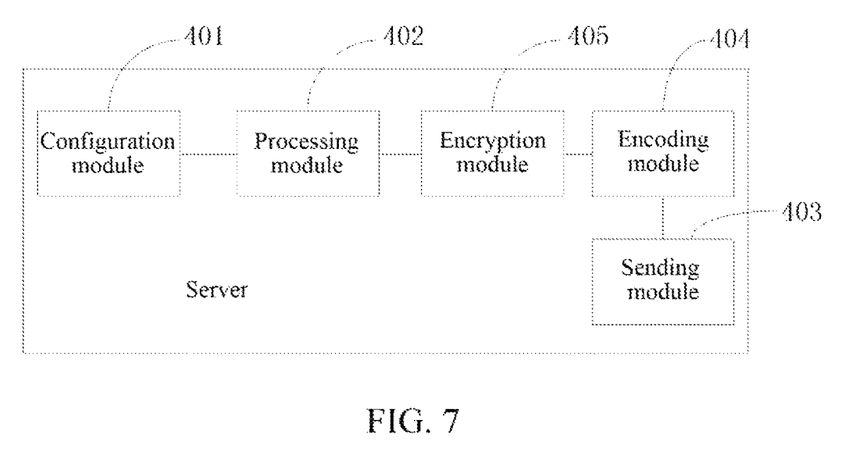
FIG. 7 illustrates a structural schematic diagram of the fourth server provided by embodiment four of the present document.

If the above-mentioned factors of data transmission are simultaneously considered, based on the above-mentioned server, as illustrated in FIG. 7, in another improvement solution, the server provided by this embodiment may further include an encryption module 404 and an encoding module 405; the encryption module 405 is arranged to, before the processing module 402 adds the rich text information into the extended field, perform encryption to the rich text information; the encoding module 404 is arranged to perform encoding to the rich text information encrypted by the encryption module; and at this moment, the processing module 402 is further arranged to add information about an encoding format for encoding the rich text information and information about an encryption algorithm for encrypting the rich text information into the extended field such that the terminal performs decoding and decryption to the rich text information.

Alternatively, in this embodiment, the rich text information includes HTML format data or a website address.

The server in this embodiment can push information such as formatted characters, pictures and videos, instead of some simple character information only, to the user to prompt the user, and the user experience of experiencing upgrade functions can be greatly improved.

Embodiment Five

Figure 8:
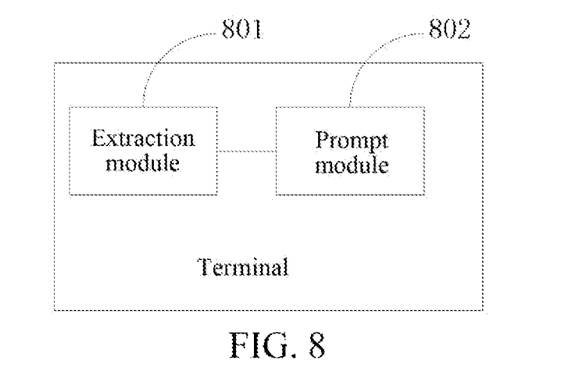
FIG. 8 illustrates a structural schematic diagram of the first terminal provided by embodiment five of the present document.

As illustrated in FIG. 8, this embodiment provides a terminal, including an extraction module 801 and a prompt module 802, herein, the extraction module 801 is arranged to extract rich text information from a newly added extended field of a notification command of an OMA-DM protocol; and the prompt module 802 is arranged to prompt a user according to the rich text information.

The terminal provided by this embodiment can prompt the user by using information such as formatted characters, pictures and videos, and thereby the user experience is improved.

Figure 9:
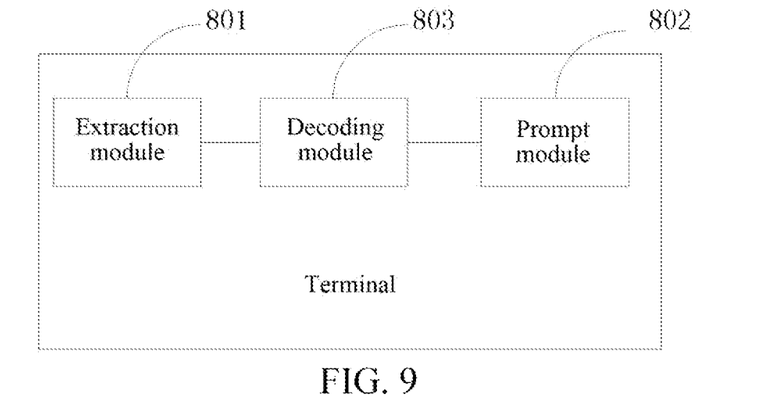
FIG. 9 illustrates a structural schematic diagram of the second terminal provided by embodiment five of the present document.

In consideration of the situation that the server which manages the terminal performs encoding to the rich text information, as illustrated in FIG. 9, based on the above-mentioned terminal, the terminal provided by this embodiment may further include a decoding module 803; the extraction module 801 is further arranged to extract information about an encoding format from the extended field of the notification command; and the decoding module 803 is arranged to, before the prompt module 802 prompts the user according to the rich text information, perform decoding to the rich text information according to the information about the encoding format.

Figure 10:
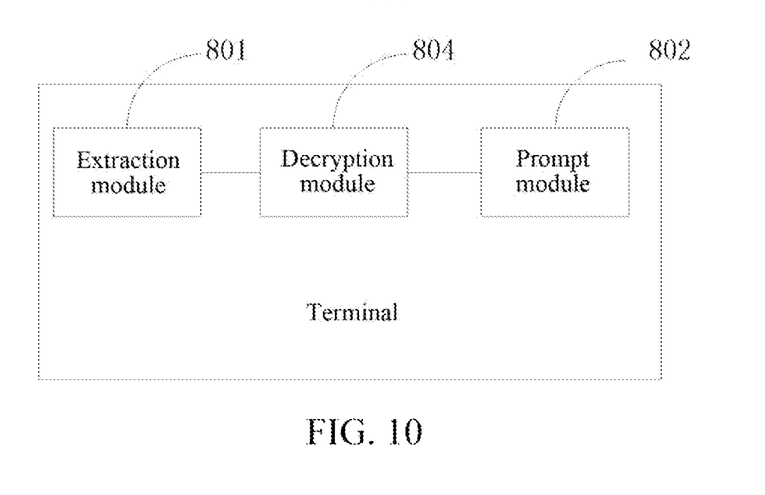
FIG. 10 illustrates a structural schematic diagram of the third terminal provided by embodiment five of the present document.

In consideration of the situation that the server which manages the terminal performs encryption to the rich text information, as illustrated in FIG. 10, based on the above-mentioned terminal, the terminal provided by this embodiment may further include a decryption module 804; the extraction module 801 is further arranged to extract information about an encryption algorithm from the extended field of the notification command; and the decryption module 804 is arranged to, before the prompt module prompts the user according to the rich text information, perform decryption to the rich text information according to the information about the encryption algorithm.

Figure 11:
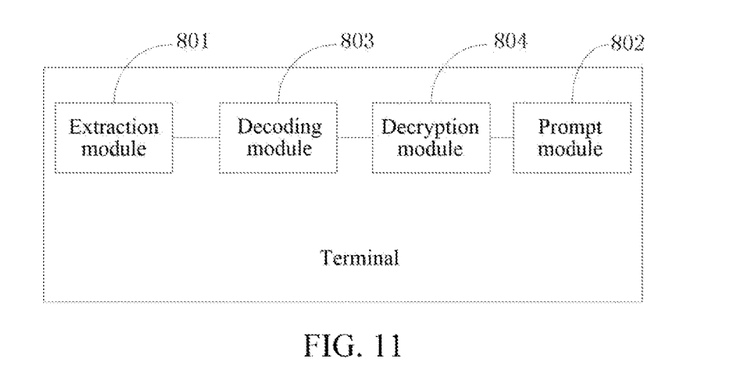
FIG. 11 illustrates a structural schematic diagram of the fourth terminal provided by embodiment five of the present document.

In consideration of the situation that the server which manages the terminal simultaneously performs encryption and encoding to the rich text information, as illustrated in FIG. 11, based on the above-mentioned terminal, the terminal provided by this embodiment may further include a decoding module 803 and a decryption module 804; at this moment, the extraction module 801 is further arranged to extract information about an encoding format and information about an encryption algorithm from the extended field of the notification command; the decoding module 803 is arranged to, before the prompt module 802 prompts the user according to the rich text information, perform decoding to the rich text information according to the information about the encoding format; and the decryption module 804 is arranged to, before the prompt module 802 prompts the user according to the rich text information, perform decryption to the rich text information decrypted by the decoding module 803 according to the information about the encryption algorithm.

In this embodiment, the rich text information received by the terminal may include HTML format data or a website address. Aiming at these two situations, a specific process that the prompt module 802 prompts the user in this embodiment is as the following:

The prompt module 802 is arranged to, when the rich text information includes HTML format data, call a local browser control of the terminal to display the HTML format data; and when the rich text information includes a website address, call a local browser control of the terminal to open the website address and display webpage contents corresponding to the website address.

The terminal provided by this embodiment can display formatted character information, picture information or video information to the user, and thereby the user experience is improved.

Embodiment Six

Figure 12:
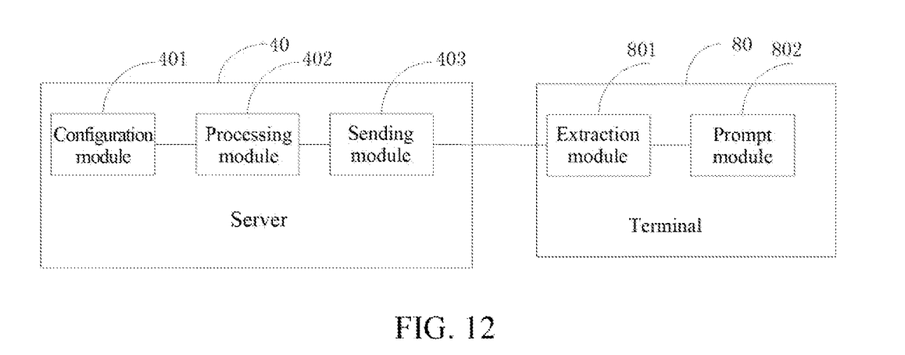
FIG. 12 illustrates a structural schematic diagram of a terminal management system provided by embodiment six of the present document.

As illustrated in FIG. 12, this embodiment provides a terminal management system, including a server 40 and a terminal 80, herein, the server 40 includes a configuration module 401, a processing module 402 and a sending module 403; and the terminal 80 includes an extraction module 801 and a prompt module 802.

The configuration module 401 is arranged to configure rich text information used for prompting a user aiming at different terminals;

the processing module 402 is arranged to select corresponding rich text information according to identification information of the terminal 80, and add the corresponding rich text information into a newly added extended field of a notification command of an OMA-DM protocol;

the sending module 403 is arranged to send the notification command to the terminal 90;

the extraction module 801 is arranged to extract the rich text information from the newly added extended field of the notification command of the OMA-DM protocol; and the prompt module 802 is arranged to prompt the user according to the rich text information.

By adopting the terminal management system provided by this embodiment, the server 40 can push information such as formatted characters, pictures and videos, instead of some simple character information only, to the user to prompt the user, and thereby the user experience of experiencing upgrade functions can be greatly improved.

The embodiment of the present document further provides a computer program, including program instructions, which, when executed by a server, cause the server to be capable of executing the method provided by embodiment one.

The embodiment of the present document further provides a computer program, including program instructions, which, when executed by a terminal, cause the terminal to be capable of executing the method provided by embodiment two.

The embodiment of the present document further provides a carrier carrying any one of the computer programs.

Those with ordinary skill in the art can understand that all or partial steps in the above-mentioned methods may be completed by relevant hardware instructed by a program, and the program may be stored in a computer readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The present document is not limited to combinations of hardware and software in any specific form.

The above-mentioned contents are further detailed descriptions about the present document in combination with the specific implementation modes and it shall not be considered as that the specific implementation of the present document is only limited to these descriptions. One skilled in the art may also make various simple deductions or replacements without departing from the concept of the present document, and however, such deductions or replacements shall be considered as included in the protection scope of the present document.

INDUSTRIAL APPLICABILITY

The embodiments of the present document can enable the server to flexibly send notification messages, the user experience in the terminal management process can be greatly improved and the user can be better helped to use the terminal manage tasks.

What I claim is:

1. A terminal management method, comprising:
a server configuring rich text information used for prompting a user for a terminal, wherein the server configures different rich text information for different terminals, and the rich text information comprises rich text format data which at least comprises at least one of picture information, video information, and formatted character information; and
the server selecting corresponding rich text information according to identification information of the terminal which is managed at current to add into a newly added extended field of a notification command of an Open Mobile Alliance Device Management (OMA-DM) protocol, and sending the notification command to the terminal such that the terminal prompts the user according to the rich text information,
wherein,
before adding the rich text information into the extended field, performing encoding to the rich text information; and adding information about an encoding format for encoding the rich text information into the extended field such that the terminal performs decoding to the rich text information;
or
before adding the rich text information into the extended field, performing encryption to the rich text information; and adding information about an encryption algorithm for encrypting the rich text information into the extended field such that the terminal performs decryption to the rich text information;
or
before adding the rich text information into the extended field, performing encryption and encoding to the rich text information; and adding information about an encoding format for encoding the rich text information and information about an encryption algorithm for encrypting the rich text information into the extended field such that the terminal performs decoding and decryption to the rich text information.

2. The terminal management method according to claim 1, wherein the rich text information further comprises Hypertext Markup Language (HTML) format data or a website address.

3. A terminal management method, comprising:
a terminal extracting rich text information from a newly added extended field of a notification command of an Open Mobile Alliance Device Management (OMA-DM) protocol, and prompting a user according to the rich text information, wherein different terminals extract different rich text information, and the rich text information comprises rich text format data which at least comprises at least one of picture information, video information, and formatted character information,
wherein the method further comprises:
before prompting the user according to the rich text information,
extracting information about an encoding format from the extended field of the notification command and then performing decoding to the rich text information according to the information about the encoding format;
or
extracting information about an encryption algorithm from the extended field of the notification command and then performing decryption to the rich text information according to the information about the encryption algorithm;
or
extracting information about an encoding format and information about an encryption algorithm from the extended field of the notification command and then performing decoding and decryption to the rich text information according to the information about the encoding format and the information about the encryption algorithm.

4. The terminal management method according to claim 3, wherein,
the rich text information further comprises Hypertext Markup Language (HTML) format data, and the step of prompting the user according to the rich text information comprises: the terminal calling a local browser control to display the HTML format data; or
the rich text information further comprises a website address, and the step of prompting the user according to the rich text information comprises: the terminal calling a local browser control to open the website address and display webpage contents corresponding to the website address.

5. A terminal management method, comprising:
a server configuring rich text information used for prompting a user for a terminal wherein the server configures different rich text information for different terminals, and the rich text information comprises rich text format data which at least comprises at least one of picture information, video information, and formatted character information;
the server selecting corresponding rich text information according to identification information of the terminal which is managed at current to add into a newly added extended field of a notification command of an Open Mobile Alliance Device Management (OMA-DM) protocol, and sending the notification command to the terminal; and
the terminal extracting the rich text information from the newly added extended field of the notification command of the OMA-DM protocol and prompting the user according to the rich text information,
wherein,
before adding the rich text information into the extended field, the server performing encoding to the rich text information; and adding information about an encoding format for encoding the rich text information into the extended field such that the terminal performs decoding to the rich text information;
or
before adding the rich text information into the extended field, the server performing encryption to the rich text information; and adding information about an encryption algorithm for encrypting the rich text information into the extended field such that the terminal performs decryption to the rich text information;
or
before adding the rich text information into the extended field, the server performing encryption and encoding to the rich text information; and adding information about an encoding format for encoding the rich text information and information about an encryption algorithm for encrypting the rich text information into the extended field such that the terminal performs decoding and decryption to the rich text information.

6. A server, comprising a processor and a storage device, wherein the storage device stores processor-executable programs and the processor-executable programs comprise: a configuration module, a processing module and a sending module, wherein, the configuration module is arranged to configure rich text information used for prompting a user for a terminal, wherein the configuration module configures different rich text information for different terminals, and the rich text information comprises rich text format data which at least comprises at least one of picture information, video information, and formatted character information;

the processing module is arranged to select corresponding rich text information according to identification information of the terminal which is managed at current, and add the corresponding rich text information into a newly added extended field of a notification command of an Open Mobile Alliance Device Management (OMA-DM) protocol; and the sending module is arranged to send the notification command to the terminal such that the terminal prompts the user according to the rich text information, wherein, the processor-executable programs further comprise an encoding module; the encoding module is arranged to, before the processing module adds the rich text information into the extended field, perform encoding to the rich text information; and the processing module is further arranged to add information about an encoding format adopted by the encoding module for encoding the rich text information into the extended field such that the terminal performs decoding to the rich text information;

or the processor-executable programs further comprise an encryption module; the encryption module is arranged to, before the processing module adds the rich text information into the extended field, perform encryption to the rich text information; and the processing module is further arranged to add information about an encryption algorithm adopted by the encryption module for encrypting the rich text information into the extended field such that the terminal performs decryption to the rich text information;

or the processor-executable programs further comprise an encryption module and an encoding module; the encryption module is arranged to, before the processing module adds the rich text information into the extended field, perform encryption to the rich text information;

the encoding module is arranged to perform encoding to the rich text information encrypted by the encryption module; and the processing module is further arranged to add information about an encoding format for encoding the rich text information and information about an encryption algorithm for encrypting the rich text information into the extended field such that the terminal performs decoding and decryption to the rich text information.

7. The server according to claim 6, wherein the rich text information further comprises Hypertext Markup Language (HTML) format data or a website address.

8. A terminal, comprising a processor and a storage device, wherein the storage device stores processor-executable programs and the processor-executable programs comprise: an extraction module and a prompt module, wherein, the extraction module is arranged to extract rich text information from a newly added extended field of a notification command of an Open Mobile Alliance Device Management (OMA-DM) protocol, wherein different terminals extract different rich text information, and the rich text information comprises rich text format data which at least comprises at least one of picture information, video information, and formatted character information; and the prompt module is arranged to prompt a user according to the rich text information, wherein the processor-executable programs further comprise a decoding module; the extraction module is further arranged to extract information about an encoding format from the extended field of the notification command; and the decoding module is arranged to, before the prompt module prompts the user according to the rich text information, perform decoding to the rich text information according to the information about the encoding format;

or the processor-executable programs further comprise a decryption module; the extraction module is further arranged to extract information about an encryption algorithm from the extended field of the notification command; and the decryption module is arranged to, before the prompt module prompts the user according to the rich text information, perform decryption to the rich text information according to the information about the encryption algorithm;

or the processor-executable programs further comprise a decoding module and a decryption module; the extraction module is further arranged to extract information about an encoding format and information about an encryption algorithm from the extended field of the notification command; the decoding module is arranged to, before the prompt module prompts the user according to the rich text information, perform decoding to the rich text information according to the information about the encoding format; and the decryption module is arranged to, before the prompt module prompts the user according to the rich text information, perform decryption to the rich text information decrypted by the decoding module according to the information about the encryption algorithm.

9. The terminal according to claim 8, wherein the prompt module is arranged to, when the rich text information comprises Hypertext Markup Language (HTML) format data, call a local browser control of the terminal to display the HTML format data; and when the rich text information comprises a website address, call a local browser control of the terminal to open the website address and display webpage contents corresponding to the website address.

10. A terminal management system, comprising the server according to claim 6 and a, wherein the terminal comprises a second processor and a second storage device, wherein the second storage device stores second processor-executable programs and the second processor-executable programs comprise: an extraction module and a prompt module, wherein, the extraction module is arranged to extract rich text information from a newly added extended field of a notification command of an Open Mobile Alliance Device Management (OMA-DM) protocol, wherein different terminals extract different rich text information, and the rich text information comprises rich text format data which at least comprises at least one of picture information, video information, and formatted character information; and the prompt module is arranged to prompt a user according to the rich text information, wherein the second processor-executable programs further comprise a decoding module; the extraction module is further arranged to extract information about an encoding format from the extended field of the notification command; and the decoding module is arranged to, before the prompt module prompts the user according to the rich text information, perform decoding to the rich text information according to the information about the encoding format;

or the second processor-executable programs further comprise a decryption module; the extraction module is further arranged to extract information about an encryption algorithm from the extended field of the notification command; and the decryption module is arranged to, before the prompt module prompts the user according to the rich text information, perform decryption to the rich text information according to the information about the encryption algorithm;

or the second processor-executable programs further comprise a decoding module and a decryption module; the extraction module is further arranged to extract information about an encoding format and information about an encryption algorithm from the extended field of the notification command; the decoding module is arranged to, before the prompt module prompts the user according to the rich text information, perform decoding to the rich text information according to the information about the encoding format; and the decryption module is arranged to, before the prompt module prompts the user according to the rich text information, perform decryption to the rich text information decrypted by the decoding module according to the information about the encryption algorithm.

11. A non-transitory computer-readable medium carrying a computer program, wherein the computer program comprises program instructions, which, when executed by a server, cause the server to perform the steps of the method according to claim 1.

12. A non-transitory computer-readable medium carrying a computer program, wherein the computer program comprises program instructions, which, when executed by a terminal, cause the terminal to perform the steps of the method according to claim 3.

* * * * *